W. F. HIATT.
COMBINED INSULATOR AND LIGHTNING ARRESTER.
APPLICATION FILED AUG. 24, 1908.
927,045.
Patented July 6, 1909.
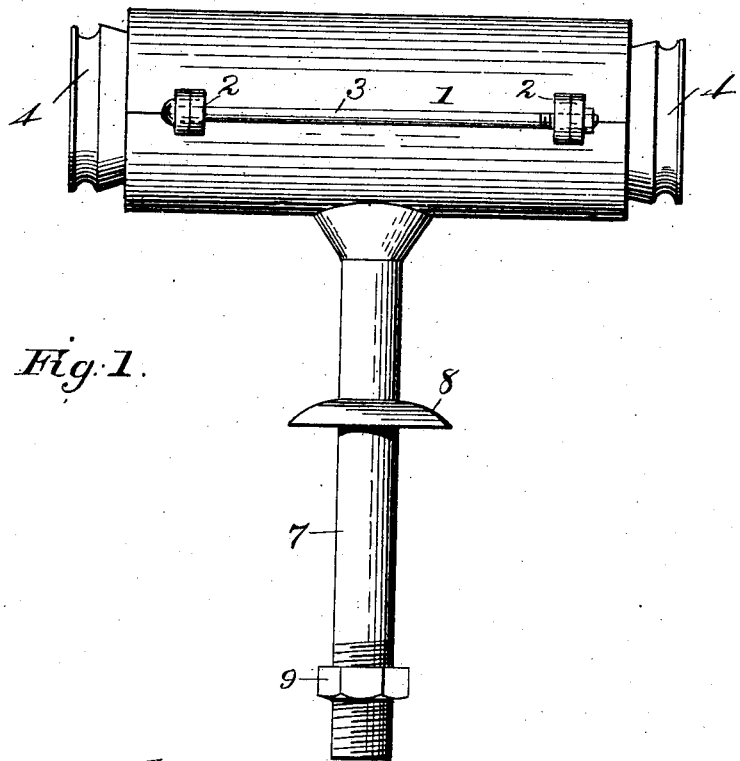
Fig. 1.
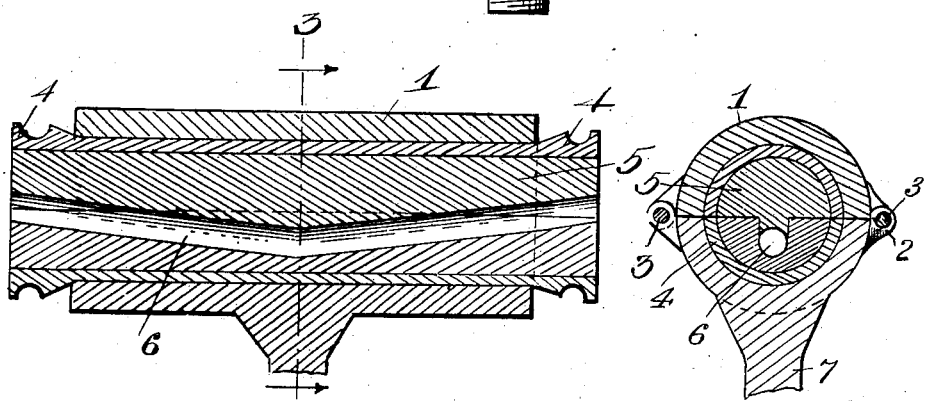
Fig. 2.
Fig. 3.
Witnesses
F. L. Ourand.
C. H. Gresbauer
Inventor
Wm F. Hiatt
By H. R. Willson & Co
Attorneys

UNITED STATES PATENT OFFICE.

WILLIAM F. HIATT, OF DANVILLE, INDIANA, ASSIGNOR OF ONE-HALF TO MELVILLE E. McHAFFIE, OF GREENCASTLE, INDIANA.

COMBINED INSULATOR AND LIGHTNING-ARRESTER.

No. 927,045.  Specification of Letters Patent.  Patented July 6, 1909.

Application filed August 24, 1908. Serial No. 450,019.

*To all whom it may concern:*

Be it known that I, WILLIAM F. HIATT, a citizen of the United States, residing at Danville, in the county of Hendricks and State of Indiana, have invented certain new and useful Improvements in Combined Insulators and Lightning-Arresters; and I do declare the following to be a full, clear, and exact description of the invention, such as will enable others skilled in the art to which it appertains to make and use the same.

This invention relates to improvements in combined insulators and lightning arresters for attaching electric wires to supports.

The object of the invention is to provide a device of this character to which electric wires may be quickly and easily attached without the use of additional fastening wires or other fastening devices, and which will serve as an efficient and reliable lightning arrester.

A further object is to provide an insulator having means whereby the wire may be firmly gripped and prevented from slipping through the insulator.

With these and other objects in view, the invention consists of certain novel features of construction, combination and arrangement of parts as will be described and particularly pointed out in the appended claims.

In the accompanying drawing, Figure 1 is a side view of an insulator constructed in accordance with the invention; Fig. 2 is a vertical longitudinal sectional view; and Fig. 3 is a transverse sectional view of the same.

In the embodiment of the invention I provide a cylindrical casing, 1, which may be formed of any suitable material and constructed in upper and lower sections hingedly connected together on each side, as shown. The hinged connection between the sections of the casing is preferably formed by means of pairs of engaging or overlapping lugs, 2, arranged near the opposite ends of each side of the casing, said lugs having formed therein alined apertures through which is removably inserted a pivot rod, 3; said rods, 3, extending between and engaging the pairs of lugs on each side of the casing, as shown. By thus connecting the sections of the casing together, the same may be opened from either side by the removal of one of the pivot rods, 3, the rod and lugs on the opposite side serving as a hinge.

In the casing, 1, is arranged a cylindrical copper lining, 4, which closely fits the inner surface of the casing, and is formed in separable sections corresponding to the sections of the casing. The lining, 4, is provided for the purpose of attracting an electrical current of unusual or dangerous force, such, for instance, as a lightning charge, from the line wires, the charge jumping to the lining, from whence it is grounded by a grounding wire. The ends of the lining, 4, preferably project beyond the ends of the casing a suitable distance to provide means for attaching a ground wire. Said projecting ends are flared outwardly and provided with an annular groove to receive the ground wire.

Within the lining, 4, is arranged a core, 5, formed of rubber or other suitable insulating material, said core being also formed in separable sections corresponding to the sections of the lining and casing. Through the core, 5, is formed a wire-receiving passage, 6, said passage having an irregular course through the core and is here shown as running in an inclined direction from the center toward the outer ends of the core.

The casing, 1, is provided with a suitable attaching shank, 7, by means of which it is secured to the arm of a telegraph pole or to other forms of support. The shank, 7, is provided near its upper end with a stop flange, 8, to engage one side of the arm or support, and on its outer end the shank is preferably threaded to receive a clamping nut, 9, whereby it is rigidly secured to its support.

By means of an insulator constructed as herein shown and described the telephone or telegraph wire may be quickly and easily engaged therewith and secured therein without the use of additional fastening devices. The wire when thus connected will be positively insulated from its support.

In use it is intended that the ground wire which is attached to the ends of the casing shall be larger than the line wire, thus presenting a greater attractive power, whereby lightning or other high and dangerous currents will jump from the line wire to the lining and from thence to the ground wire, and are thereby arrested.

While I have shown and described the device as a combined insulator and lightning arrester, it is obvious that the same may be constructed without the copper lining, thus forming simply an insulator.

In practice the combined devices or those employing the copper lining will only be used where it is desired to provide a lightning arrester, and at other points along the line simply the insulator construction will be employed.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. A device of the class described comprising a cylinder, a core of insulating material constructed of separable sections, one of said sections having an irregular groove therein, and a projection on the other section adapted to enter the groove and hold a wire therein.

2. A device of the class described comprising a cylinder, a core of insulating material constructed of separable sections, one of said sections having a groove formed therein which is deepest in the center, and a V-shaped lug on the other section adapted to enter the groove and press a wire therein at its center.

3. A device of the class described, comprising a cylinder, a core of insulating material constructed of separable sections, one of said sections having a groove formed therein which is deepest in the center, and a V-shaped lug on the other section adapted to enter the groove and press a wire therein at its center, said lug having a groove to co-act with the groove in the first section to form a wire receiving channel.

In testimony whereof I have hereunto set my hand in presence of two subscribing witnesses.

WILLIAM F. HIATT.

Witnesses:
G. MASON,
EMMA MASTEN.